US010895663B2

(12) United States Patent
Hashem et al.

(10) Patent No.: US 10,895,663 B2
(45) Date of Patent: Jan. 19, 2021

(54) APPARATUS AND METHODS FOR EVALUATING FORMATIONS

(71) Applicant: Pietro Fiorentini (USA), Inc, Wheeling, WV (US)

(72) Inventors: Mohammed Hashem, Houston, TX (US); Margaret Waid, Medicine Park, OK (US); Paolo Nardi, Milan (IT); Michael Yuratich, Hamble (GB)

( * ) Notice: Subject to any disclaimer, the term of this patent is extended or adjusted under 35 U.S.C. 154(b) by 28 days.

(21) Appl. No.: 16/491,711

(22) PCT Filed: Mar. 6, 2018

(86) PCT No.: PCT/US2018/021049
§ 371 (c)(1),
(2) Date: Sep. 6, 2019

(87) PCT Pub. No.: WO2018/165095
PCT Pub. Date: Sep. 13, 2018

(65) Prior Publication Data
US 2020/0379139 A1    Dec. 3, 2020

Related U.S. Application Data

(60) Provisional application No. 62/467,567, filed on Mar. 6, 2017.

(51) Int. Cl.
| | | |
|---|---|---|
| *G01V 5/10* | (2006.01) |
| *E21B 49/00* | (2006.01) |
| *E21B 43/267* | (2006.01) |
| *E21B 49/10* | (2006.01) |
| *E21B 49/08* | (2006.01) |
| *E21B 23/04* | (2006.01) |
| *E21B 33/12* | (2006.01) |

(52) U.S. Cl.
CPC ........ G01V 5/102 (2013.01); E21B 23/04115 (2020.05); E21B 43/267 (2013.01); E21B 49/008 (2013.01); E21B 49/0875 (2020.05); E21B 49/10 (2013.01); *E21B 33/12* (2013.01)

(58) Field of Classification Search
CPC ................ G01V 5/102; E21B 49/0875; E21B 23/04115; E21B 43/267; E21B 49/008; E21B 49/10; E21B 33/12
See application file for complete search history.

(56) References Cited

U.S. PATENT DOCUMENTS

| | | |
|---|---|---|
| 3,273,647 A | 9/1966 | Briggs, Jr. |
| 4,339,948 A | 7/1982 | Hallmark |
| 5,269,180 A | 12/1993 | Dave et al. |
| 5,303,775 A * | 4/1994 | Michaels ................ E21B 49/10 166/264 |

(Continued)

FOREIGN PATENT DOCUMENTS

| | | | |
|---|---|---|---|
| WO | 2016085451 A1 | 6/2016 | |
| WO | WO-2016085451 A1 * | 6/2016 | ............. E21B 7/007 |
| WO | 2017015340 A1 | 1/2017 | |

*Primary Examiner* — Crystal J Miller
(74) *Attorney, Agent, or Firm* — Matthew J Patterson

(57) ABSTRACT

Methods and systems for delivering EOR substances and determining their efficiency in real time, or near real time, are disclosed. The systems and methods of the present disclosure are especially important in determining petrophysical information about the reservoir as well as the in-situ effect of substances on enhanced oil recovery.

12 Claims, 4 Drawing Sheets

(56) References Cited

U.S. PATENT DOCUMENTS

| | | |
|---|---|---|
| 5,473,939 A | 12/1995 | Leder et al. |
| 2005/0082059 A1* | 4/2005 | Nogueira .............. E21B 49/081 |
| | | 166/264 |
| 2014/0353479 A1 | 12/2014 | Edwards et al. |

* cited by examiner

APPARATUS AND METHODS FOR EVALUATING FORMATIONS

CROSS REFERENCE TO RELATED APPLICATIONS

This application claims the benefit of U.S. Provisional Patent Application Ser. No. 62/467,567 filed 6 Mar. 2017 and Patent Cooperation Treaty Application Serial No. PCT/US2018/21049 file 6 Mar. 2018. The disclosure of the applications above are incorporated herein by reference in their entirety.

BACKGROUND OF THE INVENTION

Field of the Art

Embodiments of the disclosure generally relate to tools and techniques for performing formation testing and, more particularly, to testing the effectiveness of injection of stimulation solutions and materials on the production of reservoir fluids.

Description of the Related Art

Wireline formation testing tools are well known in the prior art in providing permeability, mobility, sampling and other information that can be inferenced therefrom about the reservoir. It is known that companies involved in the production of hydrocarbons strive to produce as much of the reserves within any given formation as possible. Hydrocarbon bearing formations that are either "tight", are low permeability formations or are aging formations sometimes need to be stimulated in order to enhance the recovery of the hydrocarbons. Stimulating the production of hydrocarbons from within these formations is often accomplished by fracturing select portions of the formation to increase the flow of hydrocarbons into the wellbore. Fracturing, typically involves sealing off or isolating a portion of the wellbore from the surface and pressurizing the fluid within the isolated portion of the wellbore to some pressure that in turn produces a fracture in the formation.

The isolation of the wellbore prior to fracturing is performed either when using a gelled fluid as well as an acidic solution. Isolating the wellbore can be accomplished by strategically inserting a packer within the wellbore for sealing the region where the fluid is to be pressurized. Optionally, in some formations, a high-pressure fluid can be pumped into the wellbore thereby pressurizing the entire wellbore without isolating a specific depth within the wellbore for fracing. Examples of these methods can be found in the following references: U.S. Pat. Nos. 6,705,398, 4,887,670, and 5,894,888, the disclosure of which is incorporated herein in its entirety.

However, one of the drawbacks of the presently known systems is that the fluid is dynamically pressurized by devices that are situated at the surface and above the wellbore entrance. This requires some means of conveying the pressurized fluid from the pressure source to the region within the wellbore where the fluid is being delivered. Often these means include tubing, casing, or piping through which the pressurized fluid is transported. Due to the substantial distances involved in transporting this pressurized fluid, large pressure drops can be incurred within the conveying means. Furthermore, there is a significant capital cost involved in installing such a conveying system.

At the beginning of the life cycle of a well, wireline formation testers are used to determine many factors that predict how the well will perform. Later in the life cycle of a well, the production rate will taper off for many known and unknown reasons such as reservoir pressure decline, water break through, compaction caused decreased porosity, and permeability reduction among others. Steps are taken to increase the production of a well that are commonly referred to as enhanced oil recovery (EOR). When using EOR techniques 30 to 60 percent, or more, of the reservoir's oil can be produced compared with 20 to 40 percent in normal production. In order to increase oil recovery, fluids are injected into wells positioned adjacent to the producing well. Known EOR techniques include steam injection, gas injection ($CO_2$, nitrogen, natural gas, etc.), steam flooding, chemical injection (acids, polymers, surfactants, micro emulsions, etc.), microbial injection, proppants in fracturing operations (sand, etc), and although not a true EOR substance can also include reactants to determine the presence of particular constituents, such as hydrogen sulfide ($H_2S$), among others wherein all of the substances used in these EOR techniques will be referred to herein as EOR substances. Such reactants can include methylene blue that react in the presence of $H_2S$ and shall also be considered an EOR substance for purposes of this disclosure. In order to assess the effectiveness of the EOR techniques to increase reservoir pressure, alter the mobility of the reservoir fluids, displace the oil and recover more of the reservoir fluids some key parameters need to be determined. In addition to the particular fluid, gas or technique to be used, the main parameters in which companies are interested in EOR include the rate of injection, the time to break through, incremental recovery and the miscibility pressure. Many companies employ laboratory testing to assist in predicting which material and technique, or combinations thereof, to choose for EOR. Unfortunately, using the current techniques of pumping materials from the surface, the results of any interaction can take months to years to fully realize. The in-situ conditions of a fluid cannot be replicated at a surface laboratory with certainty. Fluids need to be reconditioned at the surface, and even after reconditioning, analyses using reconstituted fluids require various assumptions to be made. This process can take it can take a very long time (months to years) and may not actually yield accurate information of the fluid when it was downhole. Since many of the materials used in EOR techniques can cause damage to pumps in wireline tools, prior art attempts to use wireline tools to introduce these materials have been problematic. An example of such an attempt is set forth in U.S. Pat. No. 8,397,817 wherein it is disclosed that such a pump had to be modified to accommodate the fracturing fluids being passed through the pump. Another example is set forth in U.S. Pat. No. 8,418,546 which comprises an embodiment wherein the EOR substances are injected into the wellbore between a pair of straddle packers. This prior art method suffers from the same problem of producing EOR substances through the pump as well as requiring a tremendous volume of EOR substances to be carried downhole to fill the volume between the straddle packers.

Accordingly, there exists a need for a fracturing system capable of directing pressurized fluid, including corrosive and abrasive fluids, to an isolated zone within a wellbore, without the pressure losses and damage to equipment suffered by currently known techniques. In addition, there exists a need for providing in-situ, near real time information related to the efficiency of EOR techniques that overcomes the problems in the prior art.

SUMMARY OF THE INVENTION

In some aspects of the present disclosure, EOR substances are injected into the reservoir and the post injection parameters are compared to initial parameters to determine the effect of such substances on enhanced oil recovery.

The present disclosure is directed at methods of testing a formation that include positioning a tool having fluid storage and pumping capability at a preselected location within a wellbore of a well and sealing a portion of the tool against a wall of the wellbore bore to provide a pressure seal between the tool and the wellbore and contacting a portion of the wall with a snorkel hydraulically coupled to the tool and pumping at least one EOR substance from at least one fluid storage container within the tool through the snorkel and into the formation and reversing the pumping to pump fluids out of the formation and testing the formation.

The methods of the present disclosure further include where the pumping forms fractures in the formation and where the EOR substance is a proppant and enters the fractures.

The present disclosure is further directed at a tool for downhole formation testing having a probe assembly adapted to extend laterally from the tool into an extended position having a snorkel adapted to contact a wellbore wall in the extended position and a packer positioned about the snorkel to seal against the wellbore wall in the extended position and a pair of shoes positioned on a side of the tool opposite the probe assembly adapted to extend laterally from the tool and press against the wellbore wall in an extended position and a hydraulic line positioned within the tool in hydraulic communication with the snorkel and at least one pump positioned within the tool in hydraulic communication with the hydraulic line and at least one fluid storage container positioned within the tool between the at least one pump and the snorkel in hydraulic communication with the hydraulic line. The tool can also include a first and second selectively positionable valves located along the hydraulic line and selectively in hydraulic communication with at least one of the hydraulic line and the at least one fluid storage container.

The tool of the present disclosure can further include at least one fluid storage container that contains at least one EOR substance. Further where the at least one fluid storage container comprises a first chamber and a second chamber disposed there within and wherein the at least one EOR substance is disposed within the first chamber.

BRIEF DESCRIPTION OF THE DRAWINGS

So that the manner in which the above recited features of the present disclosure can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention can admit to other equally effective embodiments.

DETAILED DESCRIPTION

The present disclosure can comprise a formation dynamic testing (FDT) tool which includes a probe or other conduit for injecting or producing fluids in or out of the formation for an EOR substance delivery and sample collection system. The EOR substance delivery system includes EOR substance containers positioned in close proximity to the probe and operationally positioned to avoid going through a pump. The present disclosure can comprise a wireline deployed formation tester or a logging while measuring (LWD) or measuring while drilling (MWD) tool having the ability to dynamically flow fluids to and from the reservoir while producing information about the reservoir fluids and their production.

Figure 1:
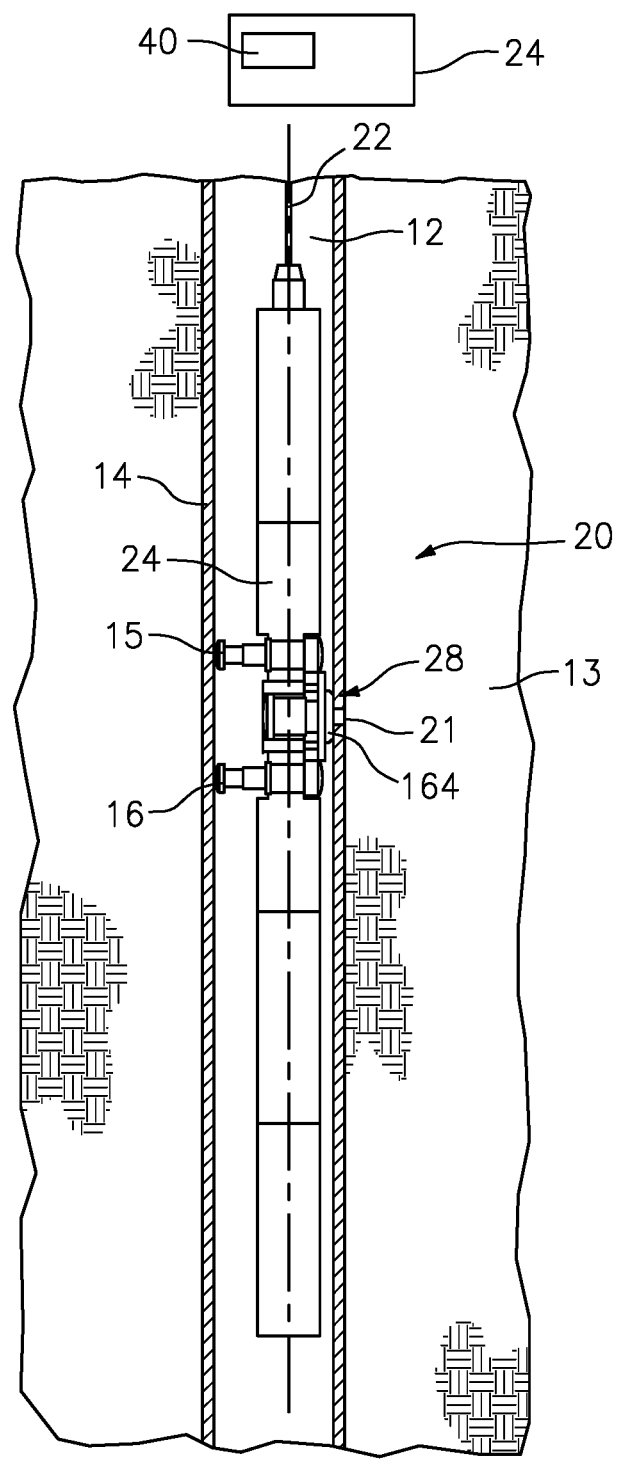
FIG. 1 is a schematic representation of a formation tester for analyzing downhole formation fluids in accordance with certain aspects of the present disclosure.

Examples of Tools for Monitoring the Efficiency of EOR Substances in Real Time With reference to FIG. 1 there is shown an embodiment of a formation tester 20 deployed within a well 12 drilled into formation 13. In operation, formation tester 20 is deployed into well 12 via wireline cable 22. As is well known in the art, wireline cable 22 includes electrical conductors for powering the tool, data communications conductors as well as tensile strength for supporting the weight of the testing tool. The wellbore 12 typically contains various mixtures of fluids and gasses wherein the mixture varies by depth, age of the well and various other factors. The well is shown as an open hole however, the present disclosure is not limited to open hole wells and could, for instance, be used within a cased hole well.

Still referring to FIG. 1, an embodiment of the formation tester 20 is shown deployed in wellbore 12 and includes various modules as will be described in more detail herein below. The multi-conductor wireline cable 22 caries electrical power and data to and from power and processing module 24 located at the surface. The power and processing unit includes the capability to control the various modules included in the formation tester 20. In addition, power and processing module 24 includes a processor 40, in the form of a computer and the like, for processing the electrical signals from the tool into information concerning the analysis and characterization of the downhole fluids as computer storage medium. Some, or all of this processing and analyses can be performed downhole as well. In this particular embodiment, the formation tester 20 incudes a clamping mechanism 15, 16 that is set against the wellbore wall 14 by pistons to stabilize the formation tester within the wellbore 12. The formation tester includes a probe assembly 28 having a sealing mechanism to set a probe pad 164 against wellbore wall 135 with sufficient force to releasably fix the formation tester in place during the operation of the tool including the injection of EOR substances as described herein after. The probe assembly 28 and the clamping mechanism 15, 16 are configured so that the formation tool does not rotate or wobble at predetermined depth 130. The probe pad further seals the formation 13 from the wellbore 14 in the area of contact. The probe assembly 28 includes any known design and shape and provides a conduit to permit the formation tester to have two-way communication with the formation fluid. The probe assembly 28 is in hydraulic communication with a pump mounted within the formation tester housing 26. The probe assembly can also include a guard ring (not shown) and which can comprise a loop that encircles the ring and is hydraulically coupled to a pump mounted within the formation tester housing 26. An exemplary embodiment of a focused guard probe is disclosed in U.S. Pat. No. 6,301,959 ('959) to Hrametz, the disclosure of which is incorporated herein in its entirety.

Figure 2A:
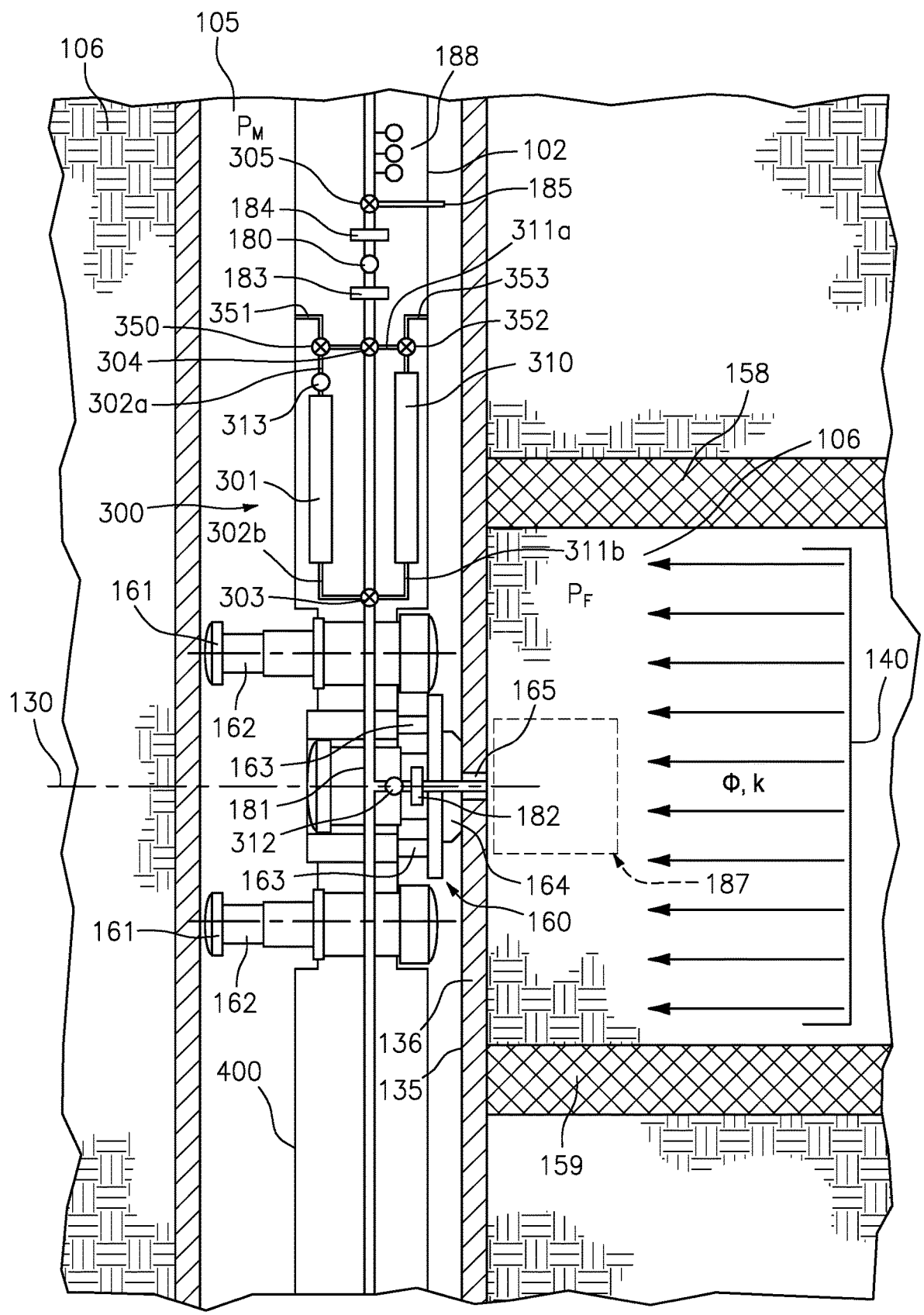
FIG. 2A is a schematic representation of a formation tester, including an EOR delivery and monitoring system in accordance with certain aspects of the present disclosure.

With reference to FIG. 2A, there is shown an embodiment of a formation testing tool 102 deployed within a well 105 drilled into formation 106 having a porosity $\Phi$ and a permeability k. The well 105 is shown as an open hole well, however embodiments of the present disclosure are not limited to open hole wells and could, for instance, be used within a cased hole well with proper additions made thereto to penetrate the casing such as perforations made prior to deploying formation testing tool 102. In this particular embodiment, the formation tester 102 incudes a clamping mechanism, or shoes 161 that are urged against the wellbore wall 135 by pistons 162 with shoes 161 to stabilize the formation tester within the wellbore 105. The formation tester includes a probe assembly 160 having a pair of pistons 163 to urge the probe pad (or doughnut packer) 164 against wellbore wall 135 with sufficient force to releasably fix the formation tester in place. The probe assembly 160 and the shoes 161 are three points that apply forces in a single plane so that the formation tool does not rotate or wobble in the preselected downhole position 130. The probe pad 164 further seals the formation 106 from the wellbore 105 in the area of contact against wellbore wall 135. The snorkel 165 comes into contact with the wellbore wall 135 and any mudcake 136 that can exist adjacent thereto and makes a hydraulic connection with the formation 105. The snorkel 165 is in hydraulic communication with hydraulic line 181 mounted within the formation tester housing 107. The probe assembly 160 can also include a guard ring (not shown) as which can comprise a loop that encircles the ring and is hydraulically coupled to a pump.

In certain situations, a sealing mud is used to form a mudcake 136 on the wellbore wall 135 to provide isolation between production zones in a wellbore. It is known in the art to provide a fluid (not shown to avoid confusion), sometimes referred to as a mud, within the wellbore to produce a pressure $P_M$ greater than the formation pressure $P_F$ to create an overbalanced condition, causing the mudcake 136 seal to form and sensibly prevent formation fluid 140 from entering the wellbore after an initial period of invasion causing a filtrate within a portion of the formation, as well as from migrating between zones. Because $P_M$ is greater than the $P_F$ some of the mud enters the formation creating both a mudcake 136 (solids from the mud) on the wellbore wall 135 and a zone of formation fluid that is contaminated with the filtrate (filtrate from the mud), also known as invaded fluid, in the formation 106 adjacent to the wellbore wall.

In operation, the formation testing tool 102 of FIG. 2A is lowered by wireline (22 in FIG. 1) to a predetermined depth 130, the shoes 161 and probe assembly 160 are urged against the wellbore wall 135, and the snorkel 165 comes into contact with the edge of formation 106. In the embodiment shown, valves 303, 304, 305 and 330 are actively controlled multi-position valves, and with the valves appropriately positioned, fluid from the testing volume 187 of the formation 106 is allowed to enter the hydraulic line 181 and a pretest module 182 draws a sample of the fluid to determine the initial formation pressure and permeability using well-known techniques. Although testing volume 187 is shown as having a defined shape and perimeter, this is done for illustrative purposes only to represent a volume from which fluids, invaded fluids as well as formation fluid 140, are extracted as will be described more fully herein below. After the pretest, pump 180 draws fluid through the snorkel 165 and circulates at least some of the fluid back into the wellbore 105 via port 185. Fluid is pumped through snorkel 165 for a sufficient period of time to remove most, if not all, of the invaded fluid in the vicinity of testing volume 187 against the snorkel 165 to obtain formation fluid 140. Using well-known techniques, testing modules 183 and 184 provide real time data to operators to assist in determining when the formation tester is producing filtrate free formation fluid 140. Although testing modules 183, 184 are shown positioned in flowline 181 near pump 180, it should be appreciated that the testing modules, as well as other testing modules, can be located elsewhere to obtain different types of information about the fluids flowing within the tool. Other testing modules (not shown) can be included in the present disclosure such as those mounted on hydraulic lines 302a, 302b, 311a and 311b to monitor substances flowing in and out of those hydraulic lines. Such testing modules can include, pH sensors, electrical conductivity cells, viscosity sensors, pressure sensors, optical analyzers, density analyzers and other such known testing modules and are capable of providing information of about at least one parameter of the testing volume. Once the formation fluids are being produced free (or nearly free) of invaded fluid, pump 180 can move formation fluid to sample sample bottles 188 for further evaluation using laboratory techniques that are well known in the industry.

In the embodiment shown in FIG. 2A, a fluid storage container such as EOR container 301 is mounted within hydraulic line 302a, 302b and between valves 303 and 304. Although only one EOR container is shown, there can be one or more EOR containers 301 that initially include EOR substances enclosed therein. EOR container 301 can have a piston positioned within the container to form two separate chambers as will be discussed more fully herein after. Examples of EOR substances include Alkaline Surfactant Polymer (ASP), water, acid, miscible gas, $CO_2$, recycled injection gas, sour injection gas, disposal fluids, $H_2S$, mud, polymers, reactants, visco-elastic surfactants, acids and fluids containing solid proppants. In the embodiment shown, valves 303, 304, 330 are actively controlled multi-position valves capable of operation with such fluids and proppant mixtures disclosed herein. Valves 303, 304, 330 and 305 are shown as multi-position valves for simplicity sake and can be replaced by multiple single position valves without departing from the scope of the disclosure. The EOR substances can be loaded into EOR container(s) 301 at the surface before the formation testing tool 102 is lowered into the wellbore 105 or they could be mixed with other EOR substances from other containers 301 while tool 102 is deployed downhole. For instance, EOR container 301 can be filled with concentrated solutions of EOR substances and valves 303, 304 and 305 can be operated to allow for the concentrated solutions to be mixed with mud (or other EOR substances) by metering the mud through hydraulic line 181. In addition, more than one EOR container 301 can be operated at the same time to allow for metered mixing of two or more EOR substances at the same time. An alternative embodiment of the present disclosure further includes a secondary pump 313 positioned in hydraulic communication with EOR container 301. Other alternative embodiments include metering valves (not shown) to allow for the injection of EOR substances in a gas phase to help determine the minimum miscibility pressure. As discussed in the paragraph immediately hereinabove, the initial reservoir pressure and hydrocarbon properties are captured using conventional methods. As will be discussed more fully herein below, the present disclosure allows for the injection of various EOR substances alone or in combination. The subsequent real-time evaluation of the effectiveness, incremental recovery and ideal compatibility of the EOR substance(s) on return permeability, the comparison of permeability after testing with the EOR substance(s) compared to initial permeability, and thus on the production of hydrocarbons from the formation is realized. It is also within the scope of the present disclosure to test the effects of EOR substances at multiple depths (locations) in a single trip downhole of the formation testing tool 102.

Figure 2B:
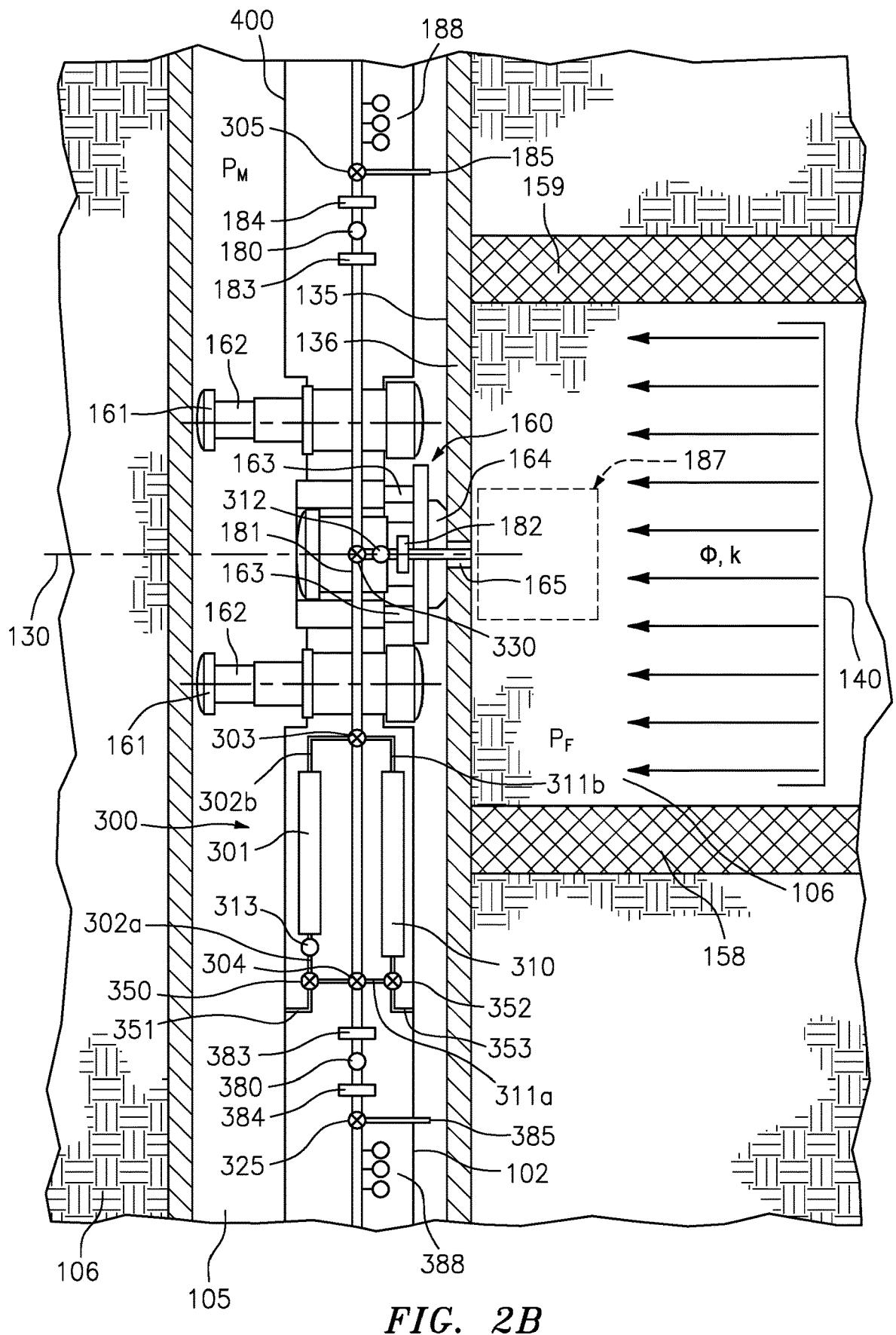
FIG. 2B is a schematic representation of a formation tester, including an EOR delivery and monitoring system in accordance with certain aspects of the present disclosure.

With reference to FIG. 2B, there is shown an alternative embodiment of a formation testing tool 102 similar to that of FIG. 2A described herein above. In this particular embodiment, the EOR substance management system 300 is positioned below (in the downhole direction) probe assembly 160. Tool 102 includes a set of sample bottles 388, testing modules 383, 384 and pump 380 and further includes port 385 that is open to the wellbore 105. In operation, the formation testing tool 102 of is lowered by wireline (22 in FIG. 1) to a predetermined depth 130, the shoes 161 and probe assembly 160 are urged against the wellbore wall 135, and the snorkel 165 comes into contact with the edge of formation 106. In the embodiment shown, valves 303, 304, 305 and 330 are actively controlled multi-position valves, and with the valves appropriately positioned, fluid from the testing volume 187 of the formation 106 is allowed to enter the hydraulic line 181 and a pretest module 182 draws a sample of the fluid to determine the initial formation pressure and permeability using well-known techniques. Although testing volume 187 is shown as having a defined shape and perimeter, this is done for illustrative purposes only to represent a volume from which fluids, invaded fluids as well as formation fluid 140, are extracted as will be described more fully herein below. After the pretest, pump 180 draws fluid through the snorkel 165 and circulates at least some of the fluid back into the wellbore 105 via port 185. Fluid is pumped through snorkel 165 for a sufficient period of time to remove most, if not all, of the invaded fluid in the vicinity of testing volume 187 against the snorkel 165 to obtain formation fluid 140. Using well-known techniques, testing modules 183 and 184 provide real time data to operators to assist in determining when the formation tester is producing filtrate free formation fluid 140. Although testing modules 183, 184 are shown positioned in flowline 181 near pump 180, it should be appreciated that the testing modules, as well as other testing modules, can be located elsewhere to obtain different types of information about the fluids flowing within the tool. Other testing modules (not shown) can be included in the present disclosure such as those mounted on hydraulic lines 302a, 302b, 311a and 311b to monitor substances flowing in and out of those hydraulic lines. Such testing modules can include, pH sensors, electrical conductivity cells, viscosity sensors, pressure sensors, optical analyzers, density analyzers and other such known testing modules. Once the formation fluids are being produced free (or nearly free) of invaded fluid, pump 180 can move formation fluid to sample sample bottles 188 for further evaluation using laboratory techniques that are well known in the industry.

In the embodiment shown in FIG. 2B, as part of an EOR substance management system 300, a fluid storage container such as EOR container 301 is mounted within hydraulic line 302a, 302b and between valves 303 and 304. Although only one EOR container is shown, there can be one or more EOR containers 301 that initially include EOR substances enclosed therein. EOR container 301 can have a piston positioned within the container to form two separate chambers. Valves 303, 304, 330 and 305 are shown as multi-position valves described herein above. The EOR substances can be loaded into EOR container(s) 301 at the surface before the formation testing tool 102 is lowered into the wellbore 105 or they could be mixed with other EOR substances from other containers 301 while tool 102 is deployed downhole. For instance, EOR container 301 can be filled with concentrated solutions of EOR substances and valves 303, 304 and 305 can be operated to allow for the concentrated solutions to be mixed with mud (or other EOR substances) by metering the mud through hydraulic line 181. In addition, more than one EOR container 301 can be operated at the same time to allow for metered mixing of two or more EOR substances at the same time. An alternative embodiment of the present disclosure further includes a secondary pump 313 positioned in hydraulic communication with EOR container 301. Other alternative embodiments include metering valves (not shown) to allow for the injection of EOR substances in a gas phase to help determine the minimum miscibility pressure (MMP) as will be discussed in more detail herein after. As discussed hereinabove, the initial reservoir pressure and hydrocarbon properties are captured using conventional methods. As will be discussed more fully herein below, the present disclosure allows for the injection of various EOR substances alone or in combination.

The subsequent real-time evaluation of the effectiveness, incremental recovery and ideal compatibility of the EOR substance(s) on return permeability, the comparison of permeability after testing with the EOR substance(s) compared to initial permeability, and thus on the production of hydrocarbons from the formation is realized. It is also within the scope of the present disclosure to test the effects of EOR substances at multiple depths (locations) in a single trip downhole of the formation testing tool 102.

It is within the scope of the present disclosure that combinations of the embodiments shown herein are possible and can have their own advantages over the prior art. For instance, it is contemplated that various components of EOR substance management system 300 may be positioned above and below probe assembly 160. For example, an EOR container 301 can positioned above the probe assembly and an EOR waste container 310 can be positioned below the probe assembly. In this example, pump 180 would displace the EOR substance as described herein above (with reference to FIG. 2A) and pump 380 would draw residual EOR substance from the testing volume 187 into EOR waste container 310. Other various combinations are contemplated by the present disclosure. In addition, and with reference to FIGS. 2A and 2B, in embodiments where hydraulic line 311b is open to wellbore 105, it is contemplated by the present disclosure that the fluid in chamber 317 (FIG. 4) of EOR waste container 310, with valves 304, 303 and 330 appropriately positioned, can be siphoned from the EOR waste container via hydraulic line 311a by pump 313. The fluid can then be used to force EOR substance out of EOR container 301 and into the testing volume 187 of formation 106 as described herein above. This particular embodiment can be useful if the wellbore mud may be harmful to EOR container 301 or if pump 380 were to fail.

In certain embodiments where the EOR substance is an acid and it is used in an acidizing operation, any type of well testing draw-down and buildup can be used to determine the mobility/permeability and skin effect of the isolated zone before the acidizing and after acidizing. Further testing with the FDT drawdown and buildup provides a local evaluation of the acidizing operation. This local testing could then be followed by further well testing or production analyses. In addition, and as described with relation to the sample bottles 188, the FDT can collect a sample of production fluid before and another after the acidizing treatment for fluid analysis. This allows evaluation of the acid treatment used for a given formation 106 and formation fluid 140 to improve and determine the best treatment or sequence of acidizing treatments to use for future and return testing by the FDT.

Figure 3:
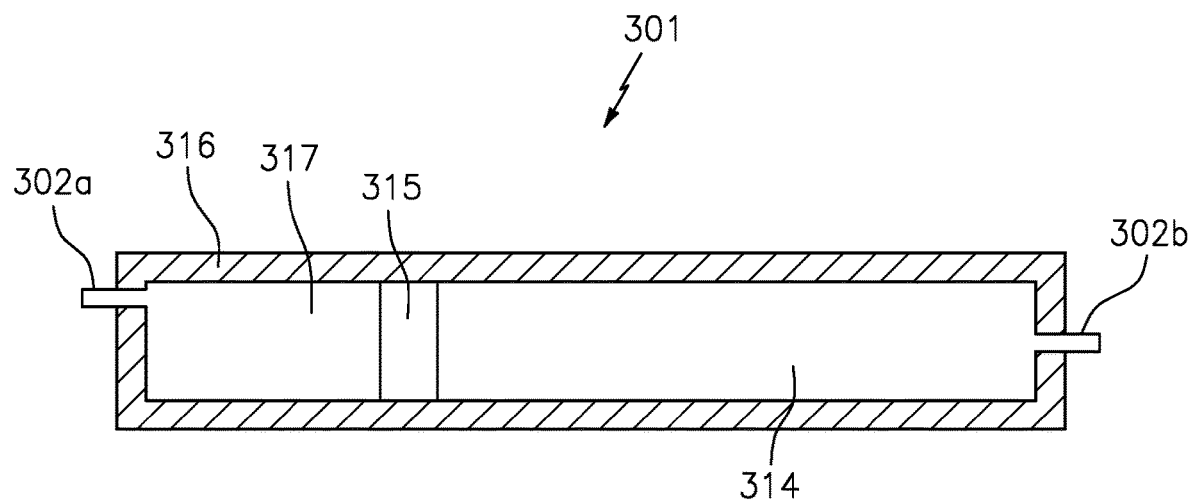
FIG. 3 is a cross section schematic of a fluid storage container in accordance with certain aspects of the present disclosure.

Now referring to FIG. 3, there is shown an embodiment of EOR container 301 in cross section. EOR container 301 includes a shell 316 and a piston 315 slidably postioned with the shell forming EOR chamber 314 and working fluid chamber 317. It should be appreciated by those skilled in the art, as pump 180 introduces mud through hydraulic line 302a and into working fluid chamber 317 it displaces piston 315 and forces EOR substance out of EOR chamber 314 via hydraulic line 302b.

Figure 4:
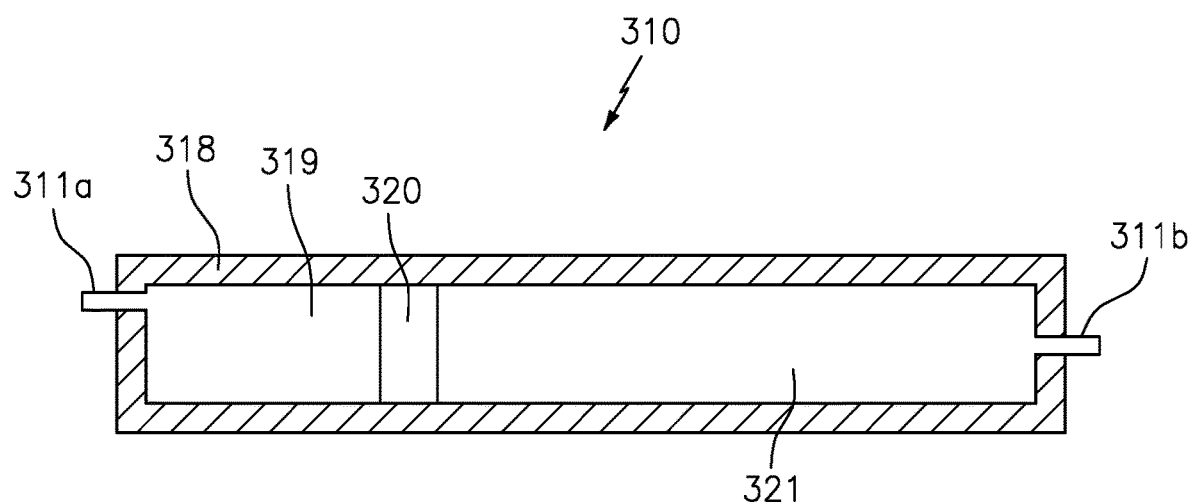
FIG. 4 is a cross section schematic of a fluid storage container in accordance with certain aspects of the present disclosure.

Now referring to FIG. 4, there is shown an embodiment of waste container 310 in cross section. Waste container 310 includes a shell 318 and a piston 320 slidably postioned with the shell forming EOR waste chamber 321 and working fluid chamber 319. It should be appreciated by those skilled in the art that as pump 180 withdraws fluid through hydraulic line 311a and out of working fluid chamber 317 it displaces piston 315 and draws residual EOR fluid waste into EOR waste chamber 321 via hydraulic line 311b.

In some embodiments of the present disclosure it may be desirable to inject EOR substances in quantities larger than the volume of EOR container(s) 301 can accommodate. In such cases, the EOR substance can be introduced into the wellbore within the mud in the vicinity of port 185 when tool 102 is positioned at predetermined depth 130 by other means in a process known in the art as "spotting". In this particular embodiment, the EOR substances that are spotted in the wellbore ("spotted fluids") consist of substances that can pass through a pump without causing deleterious effects to the pump. In such embodiments, and with reference FIGS. 2A, 2B, the spotted fluids can be drawn from the wellbore 105 into port 185 by pump 180 and the introduced into formation 106 through snorkel 165. It should be appreciated by those skilled in the art that EOR substances in EOR containers 301 can be injected before, at the same time as, or after the injection of the spotted fluids depending upon the particular circumstance. With specific reference to FIG. 2B, with the various valves 330, 303, 304, 325 and 305 appropriately positioned EOR substances from EOR container 301 can be, injected prior to, mixed with, or inject after the spotted fluid depending on the particular circumstance. In such an embodiment, pump 380 and secondary pump 313 pump wellbore fluid from port 385 through hydraulic line 302a to force the EOR substance out of EOR container 301, into hydraulic line (or flowline) 181 and through the snorkel 165 in a similar manner to that described herein above.

Also shown in FIGS. 2A and 2B, as part of EOR substance management system 300, is a fluid storage container such as waste container 310 mounted within hydraulic line 311a, 311b and between valves 303 and 304. Waste container 310 is provided within one aspect of the present disclosure to capture residual EOR substances after their injection into the testing volume 187. The waste container 310 is initially filled with a fluid, such as drilling mud, water or formation fluid, and then is subsequently used to store evacuated EOR substances as will be discussed more fully herein below. Waste container 310 can have a piston positioned within the container to form two separate chambers as will be discussed more fully herein after. It is important to note that, in accordance with certain embodiments of the present disclosure, acids and proppant loaded fluids (and other harmful EOR substances) do not enter or go through pump 180. As discussed with respect to EOR containers 301, there can be one or more waste containers 310 for storing evacuated residual EOR substances. It should be noted that once filled with residual EOR substances, waste container 310 can be emptied into the wellbore or formation as will be discussed herein below allowing reuse of the waste container 310 at other locations as well as making it safer to remove the waste containers at the surface. In addition, and as will be described more fully herein below, EOR container 301 after having been depleted can also be used as a waste container.

Examples of Methods Employing Tools for Monitoring the Efficiency of EOR Materials in Real Time An example of a method of employing the FDT of the present disclosure is best described with reference to the embodiment described in FIG. 1 and FIG. 2A. An area of the formation 106 having a formation pressure $P_F$, a porosity $\Phi$ and permeability k is selected for testing in accordance with methods well known by those in the industry at a predetermined depth 130. The testing volume 187 can contain mean gas, water, oil or an EOR substance (described herein after). Conventional methods can be utilized to determine initial parameters of the formation as described herein above with reference to FIG. 2A. The snorkel 165 is extended to provide a conduit to the testing volume 187 of interest. The pretest module 182 is used to determine the initial formation pressure and mobility and if viscosity is known permeability can be determined. The valves 303, 304, 305 are positioned to allow pump 180 to produce fluids to flow past testing modules 183, 184 to evaluate the initial properties of the fluid produced through snorkel 165. Pump 180 continues to pump fluid through snorkel 165, past testing modules 183, 184 and out into wellbore 105 through port 185 until the fluid appears to be free (or nearly free) from invaded fluids based on output from sensors and testing modules. After the flowing fluids are free (or nearly free) from invaded fluids, a pressure measurement with a build up analysis can be made to yield a second reservoir mobility/permeability after draw down. The initial or second mobility/permeability tests can be used as alternative references to evaluate the effects of pumping EOR substances as will be discussed in more detail herein after.

An important aspect of the present disclosure is the ability to determine, in real time, the effect of certain substances to enhance oil recovery in reservoir formations, aging reservoirs or other conditions where an operator might want to enhance the production from the reservoir. Still referring to FIG. 2A, this aspect of the present disclosure is presented. A known EOR substance, having been loaded into EOR container 301 at the surface, is positioned within tool between valves 303 and 304. In other cases, some or all of the EOR substance can be spotted across the test zone within the wellbore wherein the materials are needed in large quantities and can run through pump 180. Such EOR substances include ASP, water, acid, miscible gas, $CO_2$, disposal fluids, $H_2S$, mud, polymers, visco-elastic surfactants, acids and fluids containing solid proppants or any other known substances for testing the ability to enhance the recovery of reserves within a formation. With tool 102 positioned as described herein above and the snorkel 165 placed in hydraulic communication with the testing volume 187, valves 303, 304 are selectively actuated to permit pump 180 to draw drilling mud (not shown for clarity) from the wellbore 105 through port 185 and into hydraulic line 302a. Pump 180 then pumps the mud through hydraulic line 302a and behind piston 315 (FIG. 3) positioned within EOR container 301 and displaces the EOR substance from EOR container 301 into and through hydraulic line 302b, through valve 303 and into hydraulic line 181, through snorkel 165 and into the testing volume 187 of the formation 106. Other embodiments of hydraulic valving arrangements are contemplated by the present disclosure, including those disclosed in U.S. patent application Ser. No. 62/492,266, the disclosure of which is incorporated herein in its entirety.

As disclosed herein above, secondary pump 313 can be added to pump the mud into EOR container 301 and forcing the EOR substances into formation 106 and for fracturing the formation. It should be appreciated by those skilled in the art that the present disclosure advantageously provides for the injection of EOR substances that can be an abrasive or corrosive material, i.e. fluids that can damage a pump, into the testing volume 187 without passing through a pump. In the case where the EOR substance is used to fracture the formation, wherein the EOR substance is a polymer with a proppant for example, the pumps 180, 313 are sized to provide an appropriate amount of pressure of the pumping produces fractures in the testing volume 187 and permit the EOR to enter the fractured areas. It is known to use a corrosive or acid solution with proppant to etch the exposed surfaces of the fracture. The amount of any particular EOR substance, or a mixture of a combination of EOR substances, can be determined by an operator by monitoring the amount of fluids injected using flow rate tester 312. It is an aspect of the present disclosure that EOR substances can be spotted across the formation prior to the testing operations of the formation tester. It such embodiments of the present disclosure that fluids that can be handled by the pump, such as wellbore fluid, or previously spotted fluids, can be drawn in through port 185, through pump 180 and hydraulic line 181 (bypassing EOR container 301) and injected into testing volume 187 to provide for larger volume displacements of formation fluid 140. In embodiments that include secondary pump 313 the pumps 180 and 313 can be controlled to produce mixtures of EOR substances either by using know flow sensors in hydraulic lines 181 and 302b or by monitoring the stroke (or other parameter) of the pump to produce the desired predetermined mixture.

After a predetermined amount of time after injection of the EOR substances, pump 180 is then reversed and valves 303, 304 are positioned to allow pump 180 to withdraw residual EOR substances, perhaps mixed with formation fluids from the formation 106, to be drawn through hydraulic line 181 through valve 304 and hydraulic line 311b and into waste container 310. As discussed herein above, waste container 310 had previously been filled with another fluid, drilling mud or water for example, and this fluid is drawn into pump 180 through conduit 311a and moves piston 320 (FIG. 4) positioned within waste container 310 to draw residual EOR substances from the testing volume 187. It should be appreciated by those skilled in the art that in the present disclosure the EOR substances, both during injection and evacuation, never enter the pump 180 where they can damage the seals, valves, bearings and other mechanisms of pumps known in the industry. An operator (not shown) can monitor the fill level of waste container 310 with a conventional flow rate tester 312, or by estimating the pump volume over time. As discussed herein above, the present disclosure includes one or more waste containers 310 similarly situated between hydraulic lines 311a, 311b and valves 303, 304 (or similar valving arrangements). If the operator determines (for example, based on the known volume of container 310 and the flow rate indicated by tester 312 and the elapsed time of evacuation) that waste container 310 is full, a second waste container can be activated by switching the valves 303, 304 to allow residual EOR substances to enter the second (and subsequent) waste container(s). Once the operator determines that most of the residual EOR substances have been captured in the waste container 310, valves 303, 304 are selectively actuated to allow pump 180 to produce fluids from testing volume 187 to flow within hydraulic line 181 and past testing modules 183, 184 to evaluate the properties of the fluid produced through snorkel 165. Pump 180 continues to pump fluid through snorkel 165, past testing modules 183, 184 and out into the wellbore 105 through port 185 until the fluid is substantially free of residual EOR substances based on output from the testing modules. If there exists an unacceptable amount of residual EOR substances present in the flowline 181 the operator can actuate valves 303, 304 to continue the process of placing such fluids into waste container 310 as described immediately herein above. Other embodiments of hydraulic valving arrangements are contemplated by the present disclosure, including those disclosed in U.S. patent application Ser. No. 62/492,266, the disclosure of which is incorporated herein in its entirety.

It should be noted that, once the testing is complete for a given predetermined depth 130, the residual EOR substances present in waste container 310 can be emptied into the wellbore 105 or injected into the formation 106 by reversing pump 180 and injecting mud (or other fluids) into hydraulic line 311a and behind piston 320 (FIG. 4) positioned within the waste container and displacing the residual EOR substances from the waste container into and through hydraulic line 311b, through valve 303 and into hydraulic line 181, and through snorkel 165. In so doing, this allows reuse of the waste container 310 at other locations as well as making it safer to remove the waste containers at the surface. It can also permit the re-use of the residual EOR substances at a different testing location by injecting the residual EOR substances into the formation at that different testing location.

It should be further noted that, once the EOR substances for any particular EOR container 301 has been injected the residual EOR substances can be placed into the EOR container and used as a waste container by reversing pump 180 and withdrawing the fluids in chamber 317 into hydraulic line 302a (FIG. 3) drawing the residual EOR substances from the formation 106 into snorkel 165 into flowline 181 through valve 303 into hydraulic line 302b and into chamber 314 of EOR container 301. The advantage of utilizing EOR container 301 as both a vessel to carry EOR substances downhole as well as a vessel for containing residual EOR substances is that it reduces or eliminates the need for dedicated residual EOR waste containers.

The above described operation can be continued until it is determined that the EOR substance has been evacuated to a residual saturation level and formation fluid 140 predominates the mixture being pumped through the FDT 20. As a desired first step, and with valves 330, 303, 304, 305 appropriately positioned, pump 180 pumps formation fluid through port 185 and hydraulic line 181 and down though the bottom of the tool 102 and out into wellbore 105 to flush out any remaining residual EOR substances within hydraulic line 181. After treatment of the formation with EOR substance and evacuation of residual EOR substances, valves 330, 303, 304, 305 are appropriately positioned to allow formation fluid 140 to enter the hydraulic line 181 and pretest module 182 draws a sample to determine the formation pressure and permeability after the EOR treatment using the techniques described herein before. Thus, with the formation pressure and permeability obtained for both before and after injection (and extraction) of the EOR substance the effectiveness of the EOR substance can be directly determined. This also includes acid stimulation by comparing permeability and known skin before and after injection. In relation to skin, a positive skin effect indicates extra flow resistance near the wellbore, and a negative skin effect indicates flow enhancement near the wellbore. In addition, EOR incremental recovery can be determined using the sigma derived water saturation ($S_W$) as described in copending application number WO2017015340, the disclosure of which is incorporated herein in its entirety. Pump 180 then pumps formation fluid 140 past testing modules 183, 184 and samples of the formation fluid can be captured in sample bottles 188. The data gathered from the post EOR treated formation is then compared to initial parameters. Thus, the present disclosure enables the real time, or near real time, determination of the effect of stimulation or EOR on the formation 106. Improvements, if any, caused by the EOR substance(s) can be known in a very short amount of time. It should be appreciated by those skilled in the art that the selection of different stimulants, or sequence of stimulants, or EOR substances, can also be compared using the present disclosure allowing the operator to choose the ideal chemical or mixture and thereby avoiding enormously costly pilot tests of the prior art. In the case where multiple stimulants are used at predetermined depth 130, in a particular order, such FDT experiments are useful evaluating more than one troublesome mineral deposit, for example, within formation 106.

Other conventional testing methods can be employed with the present disclosure to help determine the efficiency of the EOR substances on the formation. An example, discussed herein above, is a pressure build up test. A pressure buildup transient test performed after utilizing the EOR substance provides formation pressure and also shows if there is any impact on the formation permeability as well as transportability of fluid through the fractures and whether adsorbed fluid is being moved from organic matter for non-conventional flow. In the case where the EOR substance includes proppants, the test can determine the ability of the proppants to keep fractures open.

In the case of an EOR substance comprising a miscible gas, the same procedures outlined herein above with regard to sigma values derived using the using the apparatus and methods disclosed in copending application number WO2017015340 while dynamically flowing the fluids before, during, and after injection of EOR substances. While injecting a miscible gas, pump 180 (or alternate pump 313) can control the injection pressure by controlling the flow rate and slow down pump gradually until free gas is detected by the sigma neutron detector. The point at which the sigma value indicates the detection of free gas determines the point where the gas isn't miscible, and it stays free in the testing volume 187 of formation 106. The pressure at which this occurs is an accurate, in-situ measurement, of the MMP.

The data that is derived by employing the tools and methods of the present disclosure are extremely useful in the design of future fracturing jobs for the well being tested or wells with similar characteristics. As part of the present disclosure, by utilizing tool 102 at various predetermined locations 130 associated with different formation layers to assess the ability to produce significant data derived from the fracturing can be used to identify optimal layers, or zones for future full scale fracturing jobs to optimize production. The downhole fluid analyses and samples can further be used to determine if formation fluid produced from nearby wells or nearby fractures are the same. This information can be utilized to determine the distribution of the organic matter and fluid cells within a formation (shale for example) and can be used in the development and design of new fracture protocols. Additional EOR substances and combinations thereof can be tested in a similar manner to determine their effect on incremental increases in the recovery of hydrocarbons from the reservoir. It is known that there is a relationship between total organic compound (TOC) and the productive zones of unconventional tight zones that need to be fractured to produce. Utilizing sigma neutron device 400 (FIGS. 2A, 2B) in formation testing tool 102 to obtain sigma values derived using the using the apparatus and methods disclosed in copending application number WO2017015340 while dynamically flowing the fluids before, during, and after injection of EOR substances to identify the TOC and other minerals can further identify optimal layers, or zones for future full-scale fracturing jobs to optimize production. As is known, the detector pulse outputs vary in amplitude according to the energy of the neutron capture. The count measurements from a stationary sigma neutron device 400 (FIGS. 2A, 2B) in formation tester 102, may be plotted in a histogram grouped according to the amplitude of the counts, which results in an energy spectrum, from which constituents such as TOC and other minerals of the formation 106 can be further identified. Such further analysis and use of data provided by the present disclosure is contemplated. The spectrum obtained will differ according to the time window of collection. As an example, the measured spectrum of gamma emission due to inelastic scattering during the neutron bursts may reveal information on carbon and oxygen content which is valuable because of the relationship to hydrocarbon and water respectively. As a further example of how the spectrum differs with respect to the time window of collection, the spectrum at later times may reveal information on TOC or mineral content such as aluminum (Al) which is valuable for identifying shale fraction in the test volume 187. The representative data can also be used to claim reserves, design recovery facilities and refining processes.

It is well known in the art that some downhole in situ conditions cannot be replicated a laboratory located the surface. With reference to FIGS. 2A and 2B, the formation testing tool 102 of the present disclosure inventively performs procedures similar to lab experiments downhole and in-situ. With the tool 102 positioned downhole at predetermined depth 130, many of the variables that are encountered in a laboratory are fixed, i.e. no longer variables, because the testing is performed in-situ as described herein above. Using the methods described herein above, tool 102 can assess the effectiveness of the various tested EOR substances and compare the effectiveness to each other, and combinations thereof, very accurately in part because as the testing volume 187 of formation 106 remains unchanged during testing except the displacement of EOR substances and other fluids. In this way, tool 102 provides better results that laboratory experiments, with no need to upscale, no need to use synthetic fluids and testing of the formation under its native stresses.

The data that is derived by employing the tools and methods of the present disclosure are extremely useful in the design of programs for disposing of materials used in the drilling and testing of a well. For instance, the ability to inject (injectability) EOR substances into particular layers of a well can be determined using the methods described herein above. During the drilling of a well oil based muds that include drill cuttings are produced and must be disposed of Using the aforementioned injectability data, the cuttings can be pulverized and made into a slurry, and carried in fluid storage containers to zones having acceptable injectability. The drilling waste, slurry in this example, can be injected into such zones as part of an optimization of a waste disposal program.

It should be appreciated by those skilled in the art that the present disclosure allows the safe and effective use of EOR substances that is not possible using formation testers of the prior art nor in a laboratory setting. This enhanced capability when coupled with the invention described in co-pending application number WO2017015340 allows one to use EOR and stimulation substances that are harmful to pumps of conventional FDT's and further allows the real time effect of those substances on the formation to be monitored.

While the foregoing is directed to only certain embodiments of the present disclosure certain observations of the breadth of the present disclosure should be made. Wireline, as referred to herein, can be electric wireline including telemetry and power. Wireline can also include wired slickline, pipe conveyed logging and wired coil tubing. Embodiments of the present disclosure include pumped-down-the-drill-pipe formation testing where the tools described herein exit through the drill bit. Otherwise, heretofore conventional LWD that include the present disclosure allow for formation testing and sampling where the drill pipe can be wired for power and telemetry or some other telemetry such as mud pulse or electromagnetic through the earth.

While the foregoing is directed to embodiments of the present disclosure, other and further embodiments of the invention can be devised without departing from the basic scope thereof, and the scope thereof is determined by the claims that follow.

What is claimed is:

1. A tool for downhole formation testing comprising:
   a probe assembly adapted to extend laterally from the tool into an extended probe position comprising:
   a snorkel adapted to contact a wellbore wall in the extended probe position; and
   a packer positioned around the snorkel to seal against the wellbore wall in the extended position;
   a pair of shoes positioned on a side of the tool opposite the probe assembly adapted to extend laterally from the tool and press against the wellbore wall in an extended shoe position;
   a hydraulic line positioned within the tool in hydraulic communication with the snorkel;
   at least one pump positioned within the tool in hydraulic communication with the hydraulic line; and
   at least one fluid storage container positioned within the tool between the at least one pump and the snorkel in hydraulic communication with the hydraulic line.

2. The tool of claim 1, further comprising:
   a first and second selectively positionable valves located along the hydraulic line and selectively in hydraulic communication with at least one of the hydraulic line and the at least one fluid storage container.

3. The tool of claim 2, wherein the at least one fluid storage container contains at least one EOR substance.

4. The tool of claim 3, wherein the at least one fluid storage container comprises a first chamber and a second chamber disposed there within and wherein the at least one EOR substance is disposed within the first chamber.

5. The tool of claim 4, wherein the first and second selectively positionable valves are operable to allow the at least one pump to pump a first fluid from the second chamber of the at least one fluid storage container and into the hydraulic line and to draw a second fluid from the testing volume into the snorkel and into the first chamber of the at least one fluid storage container.

6. The tool of claim 4, wherein the first and second selectively positionable valves are operable to allow the at least one pump to pump a fluid into the second chamber of the at least one fluid storage container and force the EOR substance out of the first chamber and through the snorkel into a testing volume of a formation adjacent to the wellbore wall.

7. The tool of claim 6, wherein the at least one EOR substance is a fracturing fluid and wherein the tool is operable to produce fractures in the testing volume.

8. The tool of claim 7, wherein the at least one EOR substance is a proppant and wherein the tool is adapted to force the proppant into the fractures.

9. The tool of claim 2, wherein the at least one fluid storage container comprises a waste container having a first chamber and a second chamber disposed there within and wherein a working fluid is disposed within the first chamber.

10. The tool of claim 1, wherein the at least one pump comprises a first pump and a second pump wherein the second pump is positioned between the first pump and the at least one fluid storage container.

11. The tool of claim 1, further comprising at least one testing module operable to provide information about at least one parameter of a testing volume in the formation.

12. The tool of claim 11, wherein the least one testing module comprises a sigma neutron device.

\* \* \* \* \*